July 5, 1955 — S. C. RING — 2,712,136
VENTILATOR ATTACHMENT FOR BED PANS
Filed May 1, 1952 — 2 Sheets-Sheet 1
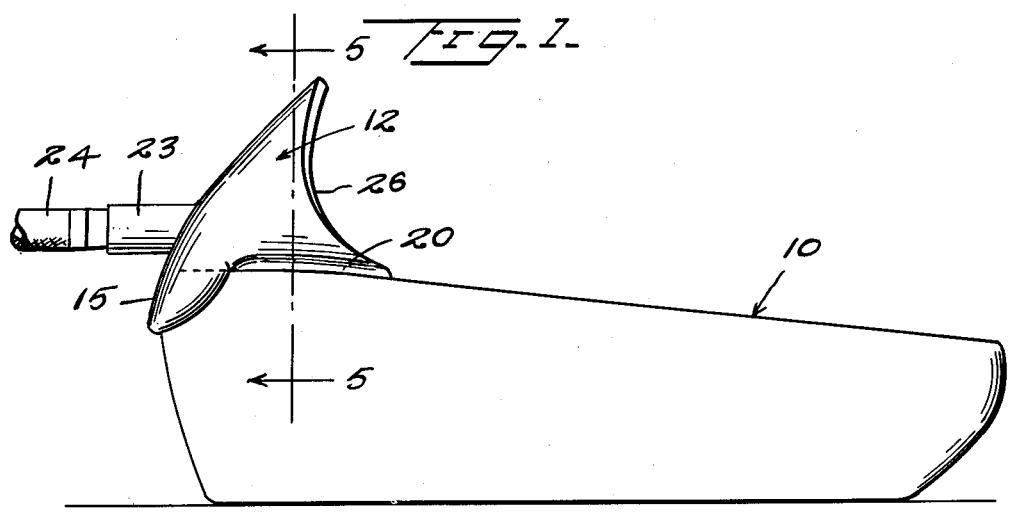
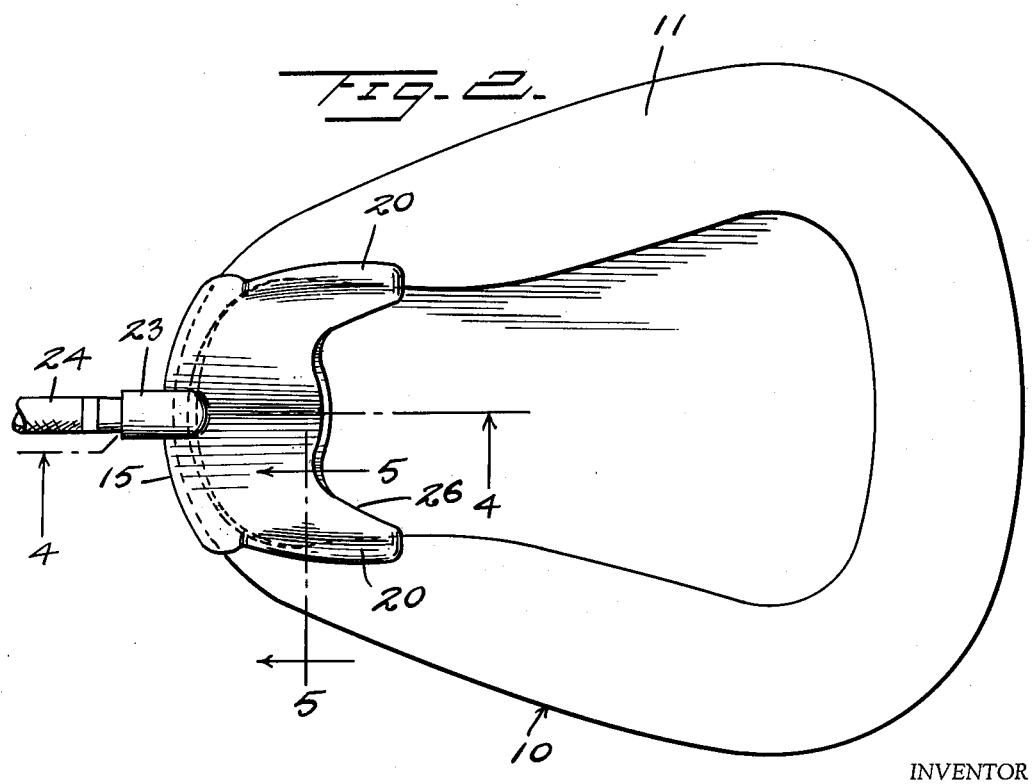
INVENTOR
Sylvanus C. Ring
BY Kimmel & Crowell
ATTORNEYS

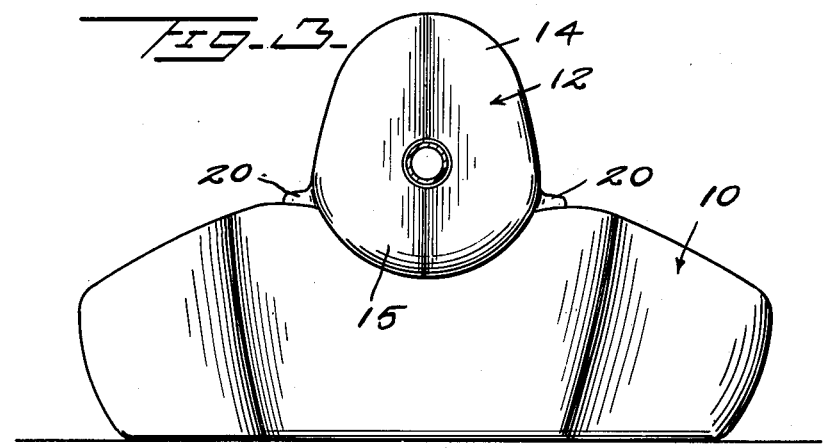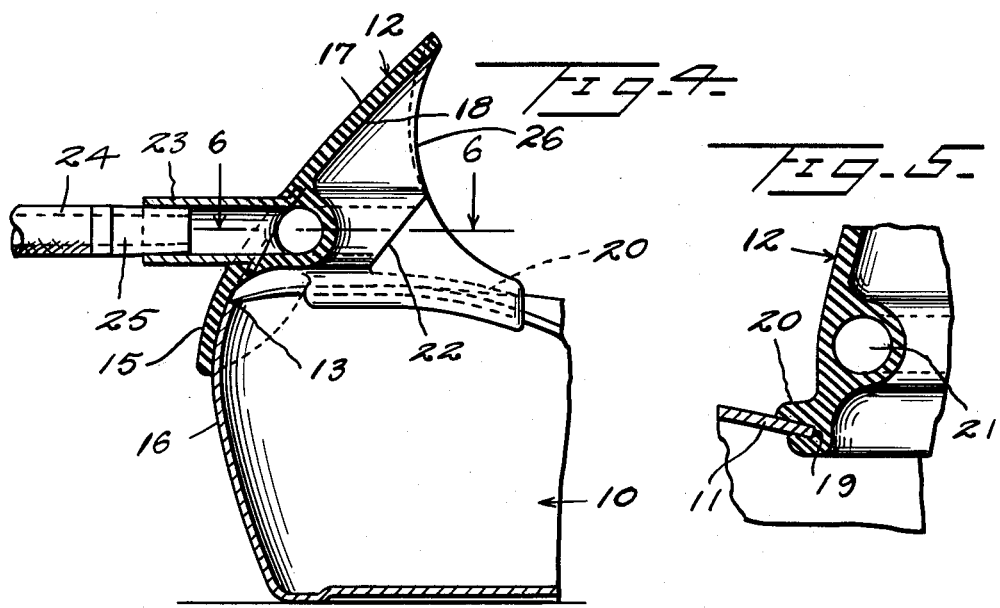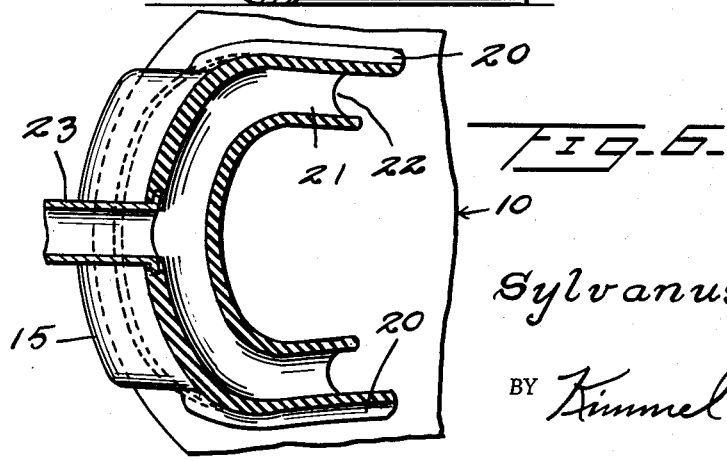

United States Patent Office 2,712,136
Patented July 5, 1955

2,712,136

VENTILATOR ATTACHMENT FOR BED PANS

Sylvanus Carl Ring, Olney, Ill.

Application May 1, 1952, Serial No. 285,519

1 Claim. (Cl. 4—112)

This invention relates to a ventilator attachment for bed pans.

An object of this invention is to provide a bed pan ventilator attachment for preventing the escape of odors, foul air, liquid and gases at the narrow or anterior portion of a bed pan and between the thighs of the user.

Another object of this invention is to provide an attachment which will fit snugly onto a conventional bed pan and can be quickly applied and removed without the aid of tools.

A further object of this invention is to provide a bed pan attachment which will not only remove the odors from the pan, but will prevent the exposure of genitals and thereby give a degree of privacy to the user.

A further object of this invention is to provide an attachment of this kind which will prevent the liquids from being discharged over the front of the bed pan.

With the above and other objects in view, my invention consists in the arrangement, combination and details of construction disclosed in the drawings and specification, and then more particularly pointed out in the appended claim.

In the drawings:

Figure 1 is a detailed side elevation of a bed pan having a ventilating attachment mounted thereon constructed according to an embodiment of this invention.

Figure 2 is a plan view of the device.

Figure 3 is a front elevation of the device.

Figure 4 is a fragmentary sectional view taken on the line 4—4 of Figure 2.

Figure 5 is a fragmentary sectional view taken on the line 5—5 of Figures 1 or 2.

Figure 6 is a fragmentary sectional view taken on the line 6—6 of Figure 4.

Referring to the drawings, the numeral 10 designates generally a conventional bed pan which is formed with an inwardly projecting top wall 11 which terminates at the forward end of the pan, as indicated at 13. A ventilating means body generally designated as 12, is mounted on the pan 10 and comprises a substantially dome-shaped hollow member 14, which is inclined upwardly and inwardly and is formed with a lip 15 which projects downwardly over the outer side of the front wall 16 of the pan 10.

The member 14 is provided with a convex outer side 17 and a concave inner side 18. The body 12 is provided along its lower portion with a channel or groove 19 within which the inner edge of the top wall 11 is adapted to snugly engage. The body 12 has the upper wall 20 of the bottom portion thereof above the channel 19 projecting outwardly over the top wall 11 of the pan so as to thereby provide a cushion or projection which may be engaged by the thighs of the user, and the pressure of the thighs on the lip or wall 20 will serve as a means for more firmly securing the device on the top wall 11.

The inner side of the body 12 has a substantially U-shaped tube or channel 21 formed thereon and the ends of the tube or channel 21 are skived off at an angle, as indicated at 22. A nipple 23 is carried by the outer side of the body 12 and communicates with the tube or channel 21. A suction tube 24, having a plug or cork 25 secured thereto, is adapted to be inserted in the nipple 23, and the tube 24 is adapted to be connected with a source of suction. The body 12 is preferably formed out of rubber, and the rear edge 26 of the body 12 is formed concavely which is adapted to snugly engage against the body of the user.

In the use of this device, the bed pan 10 is adapted to receive the body 12, the latter being mounted with the top wall 11 in the groove or channel 19. The lip 15 is adapted to overlie and snugly engage against the front wall 16 of the pan 10. The tube 24 is connected with a source of suction which may be disposed relatively remote from the pan 10.

I do not mean to confine myself with the exact details of construction disclosed herein, but claim all variations falling within the purview of the appended claim.

What is claimed is:

A ventilator attachment for a bed pan, comprising a dome-shaped body having a concave inner edge conforming in configuration to the human anatomy for snug engagement with the body of the user, an outwardly extending flange about the exterior of said body having an inclined channel thereon for engagement with the lip of a bed pan, a depending lip on the outer side of said body encircling the outer edge of said bed pan, an integrally formed substantially U-shaped channel formed interiorly in said body, the legs of the channel having an opening in the concave edge of said body, the bight of said channel communicating with an opening in said body, and a nipple communicating with said opening and extending exteriorly of said body.

References Cited in the file of this patent

UNITED STATES PATENTS

| | | |
|---|---|---|
| 657,279 | Blank | Sept. 4, 1900 |
| 1,978,468 | Malmberg | Oct. 30, 1934 |
| 2,300,109 | Dahlke | Oct. 27, 1942 |
| 2,611,903 | Wakeman | Sept. 30, 1952 |